United States Patent
Lamoncha

(10) Patent No.: US 12,542,067 B1
(45) Date of Patent: Feb. 3, 2026

(54) SYSTEMS AND METHODS FOR PROVIDING REAL-TIME EDUCATIONAL FEEDBACK AND CAREER EXPLORATION OPPORTUNITIES

(71) Applicant: Mark Lamoncha, Columbiana, OH (US)

(72) Inventor: Mark Lamoncha, Columbiana, OH (US)

(*) Notice: Subject to any disclaimer, the term of this patent is extended or adjusted under 35 U.S.C. 154(b) by 0 days.

(21) Appl. No.: 17/901,004

(22) Filed: Sep. 1, 2022

(51) Int. Cl.
G09B 7/00 (2006.01)
G06F 21/60 (2013.01)

(52) U.S. Cl.
CPC ............. *G09B 7/00* (2013.01); *G06F 21/602* (2013.01)

(58) Field of Classification Search
CPC ................................. G09B 7/00; G06F 21/602
See application file for complete search history.

(56) References Cited

U.S. PATENT DOCUMENTS

| | | | |
|---|---|---|---|
| 10,311,750 B1 | 6/2019 | Fields et al. | |
| 10,755,591 B2 | 8/2020 | Correia Gracio et al. | |
| 11,120,144 B1* | 9/2021 | Kassam-Adams | G06F 21/602 |
| 11,151,673 B1* | 10/2021 | Wray | G09B 5/00 |
| 11,651,701 B1* | 5/2023 | Shaw | G09B 5/00 |
| | | | 434/350 |
| 2004/0059445 A1* | 3/2004 | Moore | G06F 3/14 |
| | | | 715/750 |
| 2004/0072130 A1 | 4/2004 | Safran, Sr. | |
| 2006/0143569 A1* | 6/2006 | Kinsella | G06Q 10/107 |
| | | | 715/752 |
| 2007/0105080 A1* | 5/2007 | Hersh | G09B 7/02 |
| | | | 434/236 |
| 2008/0050715 A1* | 2/2008 | Golczewski | G09B 7/00 |
| | | | 434/350 |
| 2009/0300513 A1* | 12/2009 | Nims | A63F 13/816 |
| | | | 715/747 |
| 2011/0201430 A1* | 8/2011 | Maribona | G07F 17/32 |
| | | | 463/42 |
| 2013/0316323 A1* | 11/2013 | Roschelle | G09B 7/00 |
| | | | 434/350 |
| 2014/0040765 A1* | 2/2014 | Fung | G09B 5/12 |
| | | | 709/204 |
| 2017/0229030 A1* | 8/2017 | Aguayo, Jr. | G09B 7/02 |
| 2017/0337838 A1* | 11/2017 | Elkon | G09B 7/04 |
| 2017/0345109 A1* | 11/2017 | Cejnar | G09B 7/00 |

(Continued)

*Primary Examiner* — Eddy Saint-Vil
(74) *Attorney, Agent, or Firm* — Standley Law Group LLP; Jeffrey S. Standley; Adam J. Smith

(57) ABSTRACT

Systems and methods for providing educational feedback in real-time, and virtual career experiences. A content database may provide content to an educational material module, a career opportunity module, and an evaluation module that a user may interact with in real-time. The user may interact with the content through a student subsystem. The students may complete assessments through an assessment portal at the student subsystem, which may be graded in real-time by way of the evaluation module. The student performance may be provided, in exemplary embodiments, without identifying information for the student. Privacy modules may enhance student privacy. Incentives may be provided for motivating students to achieve. The career opportunity module may be configured to provide students with examples of career opportunities that match the student's interests.

17 Claims, 9 Drawing Sheets

(56) References Cited

U.S. PATENT DOCUMENTS

| | | | | |
|---|---|---|---|---|
| 2018/0075765 A1* | 3/2018 | Basson | ............... | G09B 7/00 |
| 2019/0043380 A1 | 2/2019 | Clarke, IV et al. | | |
| 2019/0087834 A1* | 3/2019 | Mercury | ............... | G09B 7/00 |
| 2019/0089701 A1* | 3/2019 | Mercury | ............... | G09B 7/00 |
| 2019/0325779 A1* | 10/2019 | Meess | ............... | G09B 19/00 |
| 2019/0385471 A1* | 12/2019 | Harris | ............... | G09B 7/00 |
| 2020/0051460 A1 | 2/2020 | Bedor et al. | | |
| 2022/0375015 A1* | 11/2022 | Botteril | ............... | G09B 5/12 |
| 2022/0406207 A1* | 12/2022 | Celano | ............... | G09B 5/02 |

\* cited by examiner

SYSTEMS AND METHODS FOR PROVIDING REAL-TIME EDUCATIONAL FEEDBACK AND CAREER EXPLORATION OPPORTUNITIES

CROSS-REFERENCE TO RELATED APPLICATIONS

This application makes no priority claim.

TECHNICAL FIELD

Exemplary embodiments relate generally to systems and methods for providing educational feedback in real time, and virtual career experiences.

BACKGROUND AND SUMMARY OF THE INVENTION

Access to high quality education is a goal shared by most societies. Even before the COVID-19 pandemic, many educational institutions were implementing or considering remote learning opportunities as one way of improving access to education. Remote learning often includes educational instruction provided by way of the internet. For example, assignments may be posted online for a student to complete, and assessments may be made available, completed, and returned for evaluation. Sometimes, educational material may be provided in a pre-recorded or live video format. Evaluations are generally provided following completion of certain instructions. These approaches lack in quality student engagement. Retaining engagement is an important consideration in all educational endeavors, especially those conducted remotely.

Further, under such approaches, a student is often left wondering how well they have mastered the material until their tests are graded and returned. Sometimes, tests are not given until after several days, weeks, or even months of instruction. Even the grading and return process can take several days, weeks, or months. During this time, the student is left unsure as to whether they are making adequate progress and whether their study habits are effective. Furthermore, under more traditional approaches to education, students are often left wondering how academic performance or proficiency, experience, and interests translate to career opportunities. Additionally, students and former students often find themselves pursuing particular career paths while lacking familiarity with, and perhaps even a basic understanding of types and/or common examples of work activity the careers involve. In many cases, students or former students will realize that they are not actually interested in a particular career once they are familiarized with the work activity of that career, and by that time, the students or former students may have already committed a substantial amount of time, effort and money towards pursuing a career path for that particular career.

Protecting student privacy is important. There is a privacy consideration in protecting student performance. Students are often motivated by grades, and individuals may be motivated by competition. However, shame or embarrassment that may come with poor performance or publication of performance is sometimes correlated with negative engagement or performance, particularly in children or younger adults.

Systems and methods are disclosed herein for providing real-time educational feedback, such as part of a remote educational subsystem. One or more student subsystems may be electronically connected to one or more instructor subsystems by way of a remote educational subsystem. The student subsystems may be configured to provide, such as by electronic display, real-time video conferencing, combinations thereof, or the like, remote educational instruction for students. The students may complete assessments through an assessment portal at the student subsystems, which may be graded in real time by way of an evaluation module at the remote educational subsystem. The students may be provided real-time feedback regarding performance at the student subsystems and/or comparative competitive performance feedback at a common display. The common display may include representations of each student's performance on a relative basis in a challenge environment, such as a race, quest, or the like. The student performance may be provided, in exemplary embodiments, without identifying information for the student and/or actual grade information for each student. In this manner, competitive environments may be provided to enhance student performance without shaming students. Privacy modules may be utilized to encrypt and/or deidentify student information to enhance student privacy. Real-time feedback regarding student performance may also be provided as qualitative as opposed to quantitative feedback. The qualitative feedback may subjectively inform a student as to his or her academic areas of adequate and/or high proficiency, as well as academic areas that may require more lessons and instruction in order to advance the overarching academic goals, learning principles, career goals, or the like, for the student.

Incentives may be provided for motivating students to achieve. The incentives may be sponsored by one or more individuals or entities. The incentives may be awarded to individual student's based on various performance criteria, such as participation, scores, progress, and/or improvement. An incentives module may control incentive awards and an account module may store the incentives for student use. Examples of incentives include, but are not necessarily limited to, gift cards, coupons, cash prizes, scholarship money, educational credits, job or educational opportunities, combinations thereof, or the like. In exemplary embodiments, advertising opportunities may be provided to sponsors in exchange for providing incentives.

Students may be given the opportunity to score or otherwise asses instructor performance based on various criteria. Instructors may be provided feedback on their performance in the same or similar manner as provided to students, such as on an individual basis or common basis. Such instructor feedback may be encrypted and/or deidentified by the privacy modules. Incentives may be provided for motivating the instructors to achieve in the same or similar fashion as students. The incentives may be awarded to instructors based on student feedback and/or performance. The instructor feedback and/or performance tracking may be used to connect students to highly-ranked instructors, such as on a subject matter and/or class specific basis.

The subject matter presented may be of any educational topic, including, but not limited to, standardized topics (e.g., math, science, history, etc.) or occupational opportunities, career pathways, spiritual guidance, therapy, mentorship and self-improvement, combinations thereof, or the like.

Even with the best educational opportunities, many students leave the educational field without a clear career direction. Sometimes this is due to a lack of awareness of career opportunities, or an insufficient awareness of what a career opportunity is like in practice.

The disclosed systems and methods may additionally, or alternatively, include a career opportunity module. The career opportunity module may be configured to provide students with examples of career opportunities that match the student's interests and purpose so that they may find or pursue their passion. For example, without limitation, the career opportunity module may comprise a database of careers linked with subjects. The career opportunity module may be configured to automatically identify careers associated in the database with subjects which the student performs well in, has completed the most courses, has expressed an interest in, combinations thereof, or the like. The student may be notified, through their system, of the careers. Said notification may occur in real-time after certain lessons or exercises are completed, at the end of a semester, after student feedback regarding career interests and learning interests/objectives is provided, some combination thereof, or the like. The student may be prompted or required to complete associated virtual career experiences. These may include, for example, without limitation, videoconferences linked to instructors with experience in the career field, requests to complete reading materials on the careers, assignments to watch videos on the careers, prompts to participate in virtual experiences regarding the careers, including, by way of example and not limitation, virtual job shadowing, combinations thereof, or the like. By guiding students towards careers relevant to their interests, purpose, and/or passion, the student may ultimately be guided towards a highly engaging career. In exemplary embodiments, without limitation, feedback surveys may be provided to students for expressing interest in various subjects or related careers, such as after completing various courses. Certain virtual career experiences may be facilitated through videoconferences and/or virtual reality or augmented reality devices in exemplary embodiments.

Students may be evaluated based on proficiency which may permit ability to advance through learning irrespective of age or other artificial classification. When sufficient mastery or achievement is demonstrated, students may be permitted to progress through additional course materials and/or become eligible for certain virtual career experiences or opportunities, various certifications or qualifications, combinations thereof, or the like.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
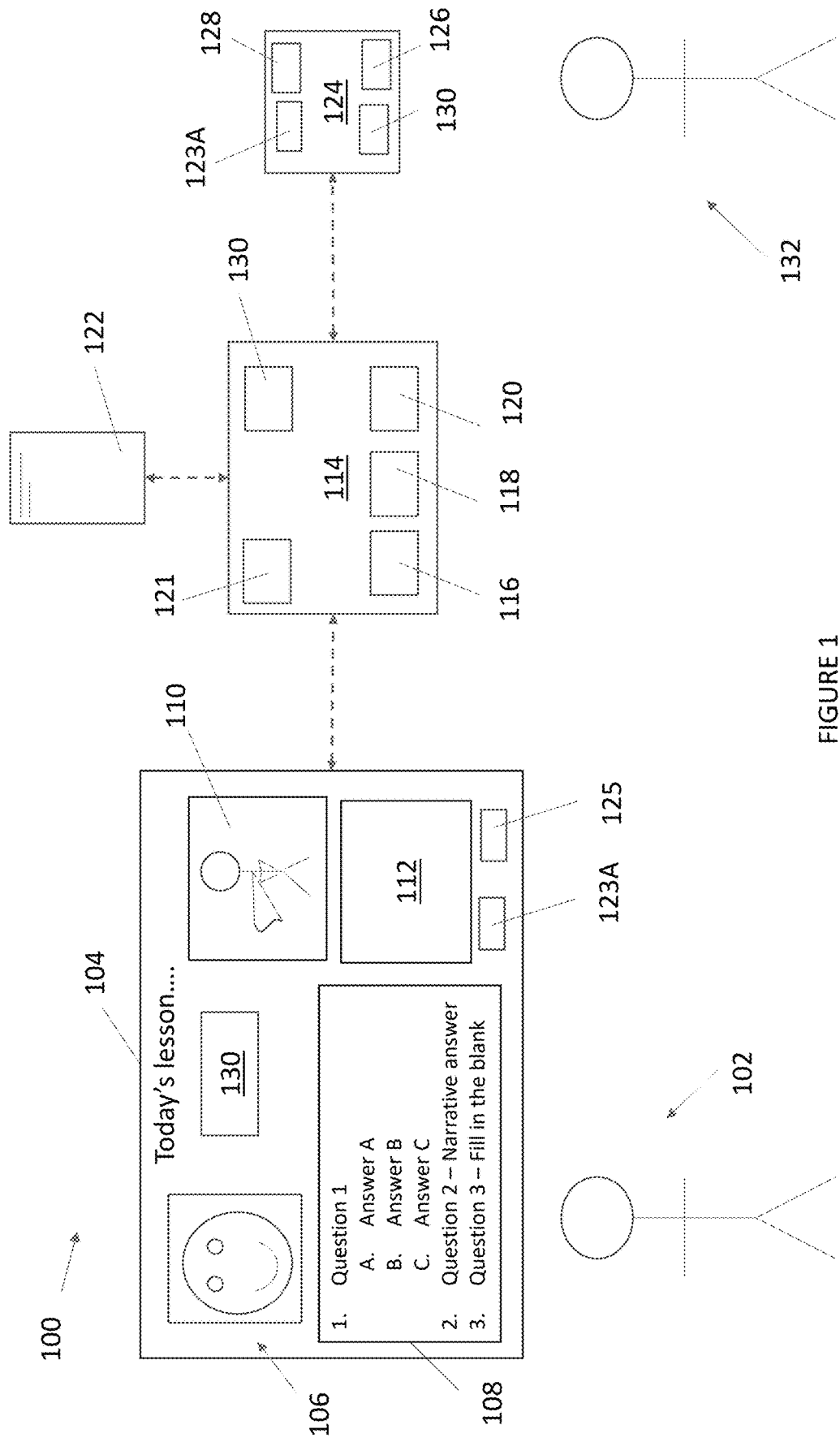
FIG. 1 is a plan view of an exemplary remote educational system for providing real-time feedback engagement.

FIG. 1 illustrates an exemplary system 100 for providing remote educational opportunities. The system 100 may comprise one or more student subsystems 104, each of which may be associated with a student 102. The student subsystems 104 may comprise computers, tablets, smartphones, servers, electronic storage devices, processors, displays, peripheral equipment (e.g., microphone, speaker, keyboard, camera, mouse, touch pads, joysticks, buttons, touch screens, combinations thereof, or the like), combinations thereof, or the like.

The student subsystems 104 may each comprise a display 106. The display 106 may comprise one or more electronic displays of the same or different size, shape, and/or type. The display 106 may be configured to display images related to educational material, such as, but not limited to, text and/or video, including, but not limited to. pre-programmed and/or real-time video conferencing type presentation material.

In exemplary embodiments, the student subsystems 104 may each comprise one or more virtual reality ("VR") and/or augmented reality ("AR") subsystems or devices. The displays 106 may comprise components of such VR and/or AR subsystems or devices. Examples of such subsystems or devices include HoloLens 2 available from Microsoft Corporation (https://www.microsoft.com/en-us/hololens) and/or the Meta Quest 2 device available form Meta Platforms Technologies, LLC (https://store.facebook.com/quest/products/quest-2/), though any type or kind of VR and/or AR type device may be utilized.

The student subsystems 104 may each comprise an assessment portal 108. The assessment portal 108 may be provided at the display 106, though such is not required. The assessment portal 108 may be configured to display various types or kinds of assessments, including, but not limited to, tests, quizzes, activities, feedback, multiple choice questions, fill in the blank questions, narrative prompts, images, videos, audio, combinations thereof, or the like. The assessment portal 108 may be configured to receive student 102 input, including, but not limited to, user selections, drawings, audio, video, images, typed characters, combinations thereof, or the like.

The student subsystems 104 may each comprise an individualized feedback display 110. The individualized feedback displays 110 may be provided at the display 106, though such is not required. The individualized feedback display 110 may be configured to provide individualized feedback for the student 102 based on progress through material, performance on assessments, such as those provided at the assessment portal 108, combinations thereof, or the like. In exemplary embodiments, without limitation, the individualized feedback display 110 may be updated in real-time. The individualized feedback display 110 may be configured to display images, video, text, provide audio output, combinations thereof, or the like. For example, without limitation, the individualized feedback display 110 may be configured to provide visual displays of grades, correct/incorrect indications, or other performance feedback in real-time, such as when assessments are completed at the assessment portion 108 and evaluated, such as by an evaluation module 116.

In exemplary embodiments, the individualized feedback display 110 may be configured to display an action hero completing various tasks, gaining components of a hero's outfit, combinations thereof, or the like. Of course, this is just one example and is not intended to be limiting. In this way, the student 102 may compete against himself or herself or some predetermined criteria. For example, without limitation, the action hero's outfit and/or actions may reflect the student's real-time-performance in completing assessments, such as at the assessment portal 108, though any metric is contemplated.

The assessment portal 108, preferably in real-time during or after one or more academic exercises or activities, may provide qualitative feedback to the student 102 as opposed to quantitative grades, or other quantitative feedback. The qualitative feedback may be guided by, for example, not by way of limitation, information provided by the student, a mentor, an instructor, some combination thereof, or the like, pertaining to the student's overarching academic goals, learning goals, learning principles, career goals and interests, learning interests, some combination thereof, or the like. Qualitative feedback may inform the student as to study subjects that may require more lessons and instruction in order to advance the student's overarching academic goals, learning goals, learning principles, career goals and interests, learning interests, some combination thereof, or the like. For example, by way of illustration and not limitation, qualitative feedback may comprise a brief report sent to the individualized feedback display 110 listing specific subjects where the student is recommended to complete additional lessons or exercises therefor to improve the student's chances of achieving proficiency thereof. Qualitative feedback may also inform the student as to the study subjects that the student has achieved an adequate or high level of proficiency for. In the aforementioned example, the brief report may further include listing specific subjects that the student has achieved proficiency for, including, by way of example and not limitation, subjects that the student is performing the highest in, and is ready to engage with advanced subject matter therefore.

The report of the aforementioned example may be generated automatically based on a comparison of the student's performance with respect to relevant subjects to the performance of other students having similar overarching academic goals, learning goals, learning principles, career goals and interests, learning interests, some combination thereof, or the like. An instructor may also be permitted to contribute feedback to a qualitative feedback report. In certain embodiments, the use of animated characters (e.g., avatars) or other symbols and qualitative feedback as opposed to traditional testing and grading may reduce student stress and contribute to a more positive learning experience for the student.

In preferred embodiments, the evaluation module 116 may be adapted to evaluate student performance with respect to different instructors. A student may be directed to lessons taught by other instructors when the student has performed poorly on multiple assessments or exercises with one particular instructor. A student may be directed to lessons taught by instructors with, comparatively speaking, records of good student performance with respect to a significant number of students, particularly when the student has not performed well in a particular subject that is relevant to the student's overarching academic goals, learning goals, learning principles, career goals and interests, learning interests, some combination thereof, or the like. Instructors with, comparatively speaking, records of poor student performance with respect to a significant number of students may be required to undergo additional training, or may no longer be eligible to instruct students.

The student subsystems 104 may each comprise an interaction subsystem 112. The interaction subsystem 112 may be provided at the display 106, though such is not required. The interaction subsystem 112 may be configured to receive user interaction from the student 102. The interaction subsystem 112 may comprise one or more user input devices including, but not necessarily limited to, one or more of a microphone, speaker, keyboard, camera, mouse, touch pads, joysticks, buttons, touch screens, combinations thereof, or the like.

Some or all of the student subsystems 104 may comprise one or more augmented reality ("AR") and/or virtual reality ("VR") devices. The display 106, assessment portal 108, and/or individualized feedback display 110 may be provided at the AR and/or VR devices. The AR and/or VR devices may serve as part of all of the interaction subsystem 112 in exemplary embodiments, without limitation.

Multiple student subsystems 104 may be provided, each of which may be associated with one or more students 102.

A remote education subsystem 114 may be in electronic communication with each of the student subsystems 104, such as by way of one or more networks.

The remote education subsystem 114 may comprise the evaluation module 116. The evaluation module 116 may be configured to generate, receive and process information from, and/or control the assessment portal 108. For example, without limitation, the evaluation module 116 may be configured to generate content at assessment portal 108, receive user input entered through the assessment portal 108, and/or automatically and electronically evaluate the user input, such as, but not limited to, in the form of positive results, negative results, grades (letter, number, percentage, combinations thereof, or the like), correct/incorrect evaluation, subjective scoring, combinations thereof, or the like.

In exemplary embodiments, the positive result may comprise positive images or the like at the undivided feedback display 110 and/or relative progress at a common display 134.

The remote education subsystem 114 may comprise an educational material module 118. The educational material module 118 may be configured to control the display 106.

The educational material module 118 may be configured to provide real-time video conferencing in exemplary embodiments.

The remote education subsystem 114 may comprise a privacy module 130. Each of the student subsystems 104 may comprise one of the privacy modules 130. The privacy modules 130 may be configured to provide encrypted and/or deidentified communication between the remote education subsystem 114, each of the student subsystems 104, a content database 122, and/or an instructor system 124. The privacy module 130 may be configured to provide encryption unique to the remote education subsystem 114, each of the student subsystems 104, the content database 122, and/or the instructor system 124, which may each respectively comprise one or more security keys for decrypting received communications, such as to maintain student 102 privacy.

Alternatively, or additionally, the privacy module 130 may be configured to remove identifying information of the students 102, which may be replaced with an anonymous identifier, such as to maintain student 102 privacy. The privacy modules 130, in exemplary embodiments, may comprise a table linking identifying information, such as personally identifying information, for the student 102 to the anonymous identifier. Such information may be stored in an encrypted and secured manner, such as, but not limited to, in dedicated and/or electronically isolated storage. In exemplary embodiments, without limitation, the privacy module 130 may be configured to associate all assessment results, such as those generated by way of activity of the evaluation module 116 and/or the assessment portal 108, with the anonymous identifier for each of the student subsystems 104 that is not otherwise tied to identifying information for the student 102. In this manner, student 102 privacy may be enhanced.

The privacy modules 130 may each comprise a closed appliance. For example, without limitation, each of the privacy modules 130 may be configured only to interact with the other privacy modules 130, which may provide interoperability between the student systems 104 and the remote education subsystem 114 and/or the instructor system 124. The privacy modules 130 may be preprogrammed and comprise dedicated hardware/software. In exemplary embodiments, without limitation, at least some of the privacy modules 130 may comprise peripheral equipment with one or more adapters for interacting with the other components of the student systems 104 and/or the instructor system 124. For example, without limitation, the privacy modules 130 may comprise USB adapters, lightning adapters, near field communication devices, Ethernet ports, combinations thereof, or the like.

The content database 122 may comprise various educational and/or assessment content, such as, but not limited to, images, videos, text, combinations thereof, or the like, such as for use at the display 106 of the student subsystems 104. The content database 122 may comprise assessment material, such as for use at the assessment portal 108. The content database 122 may comprise student performance information, such as graded assessments, for use at the individualized feedback display 110. The content database 122 may be located at the remote education subsystem 114 or may be remote therefrom. Particularly where remote, the content database 122 may comprise one of the privacy modules 130. The content database 122 may comprise one or more electronic storage devices, servers, combinations thereof, or the like. The content database 122 may comprise multiple individual databases for specific content which may collectively form the content database 122.

The content database 122 may, alternatively, or additionally, comprise educational content related to career opportunities. The students 102 may be job seekers or explorers. The instructors 132 may be entity representatives or hiring individuals. The remote education subsystem 114 may be configured to connect students 102 with instructors 132 in particular career or job fields, mentors, and/or those formerly in such fields so that the students 102 may explore additional educational and/or occupational opportunities, by way of non-limiting example. Assessments may be focused on completion of such occupation focused educational opportunities (e.g., participation based) and/or student 102 understanding of the occupational opportunity presented. Feedback may be provided in the form of one or more games or challenges, and progress through such games or challenges may be displayed or otherwise provided as a student 102 completes multiple such occupation focused educational opportunities. This may serve as a sort of virtual career day or mentorship opportunity.

The subject matter presented may be of any educational topic, including, but not limited to, standardized topics (e.g., math, science, history, etc.) or occupational opportunities, career pathways, spiritual guidance, therapy, mentorship and self-improvement, combinations thereof, or the like.

The system 100 may comprise one or more instructor subsystems 124. Each of the instructor subsystems 124 may be associated with one or more instructors 132. The instructor subsystems 124 may comprise computers, tablets, smartphones, servers, electronic storage devices, processors, displays, peripheral equipment (e.g., microphone, speaker, keyboard, camera, mouse, touch pads, joysticks, buttons, touch screens, combinations thereof, or the like), combinations thereof, or the like. In preferred embodiments, with respect to a particular learning subject, each instructor subsystem 124 is substantially controlled by an instructor with substantial training and preferably certification in the learning subject itself, and in the teaching of the learning subject. Different instructors may substantially control instructor subsystems 124 for different learning subjects based on each instructor's teaching credentials. In certain embodiments, some of the instructors are freelance instructors.

The instructor subsystems 124 may each comprise a video conferencing module 126. The video conference modules 126 may be configured to facilitate real-time video conference instruction to the students 102 by way of the remote education subsystem 114 and/or the student subsystems 104. Alternatively, or additionally, the video conference modules 126 may be configured to permit recording of educational content, such as for storage at the content database 122 and later display at the student subsystems 104. The instructor subsystems 124 may each comprise an assessment generation module 128. The assessment generation modules 128 may be configured to receive instructor input, such as questions, answers, grading criteria, combinations thereof, or the like, for storage at the content database 122 and/or subsequent generation of assessments or other content at the assessment portions 108 and/or individualized feedback display 110.

In exemplary embodiments, the instructor subsystems 124 may each comprise one or more of the VR and/or AR subsystems and/or device. The video conferencing module 126 may comprise components of such VR and/or AR subsystems and/or devices.

Figure 4:
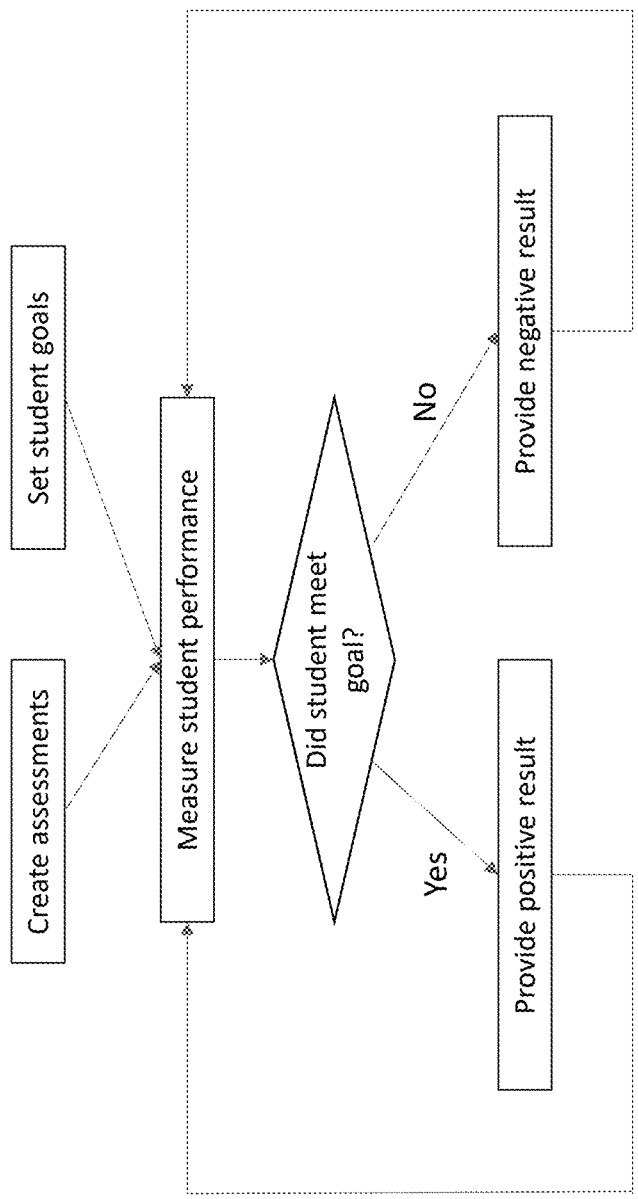
FIG. 4 is a flowchart with exemplary logic for operating the system of FIG. 1.
Figure 5:
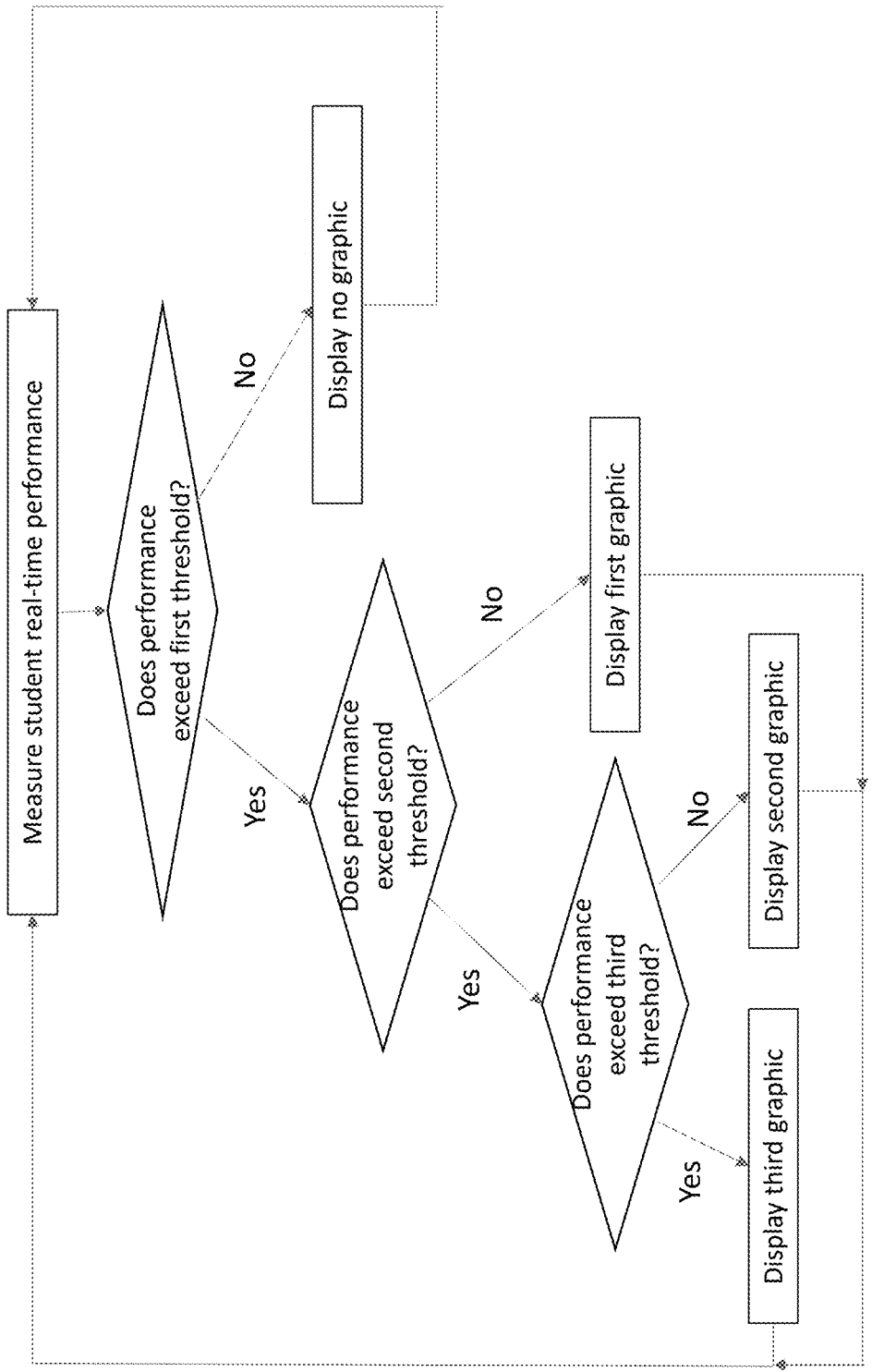
FIG. 5 is a flowchart with other exemplary logic for operating the system of FIG. 1.

As illustrated, with particular regard to at least FIG. 4, student 102 performance, such as measured by input at the assessment portals 108, may be evaluated, such as by way of the evaluation module 116. Student 102 goals may be set by the student 102 at the student system 104, the instructor 132 at the instructor subsystem 124, the evaluation module 116 of the remote education subsystem 114, combinations thereof, or the like. Where student 102 performance meets or exceeds a goal, a positive result may be provided, such as by display of one or more positive images at the display 106 of the associated one of the student systems 104. Where student 102 performance falls below the goal, a negative result may be provided, such as by display of one more negative or neutral images at the display 106 of the associated one of the student systems 104. The positive, negative, and or neutral images may be stored at the content database 122. As illustrated, with particular regard to at least FIG. 5, different images may be provided as various goals are met, exceeded, or fallen short of. This may serve to motivate students 102, especially those located remote. Such feedback may be provided in real-time or substantially real-time, such as on an ongoing basis while assessments are performed at the assessment portal 108.

Figure 2:
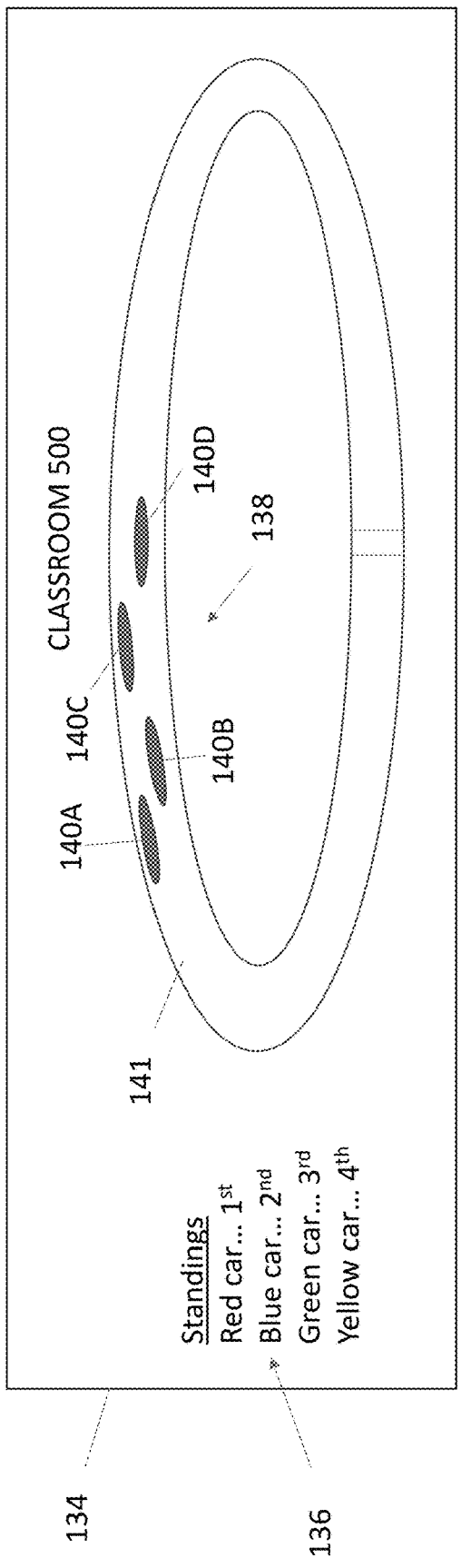
FIG. 2 is a plan view of an exemplary common feedback display for use with the system of FIG. 1.
Figure 2:
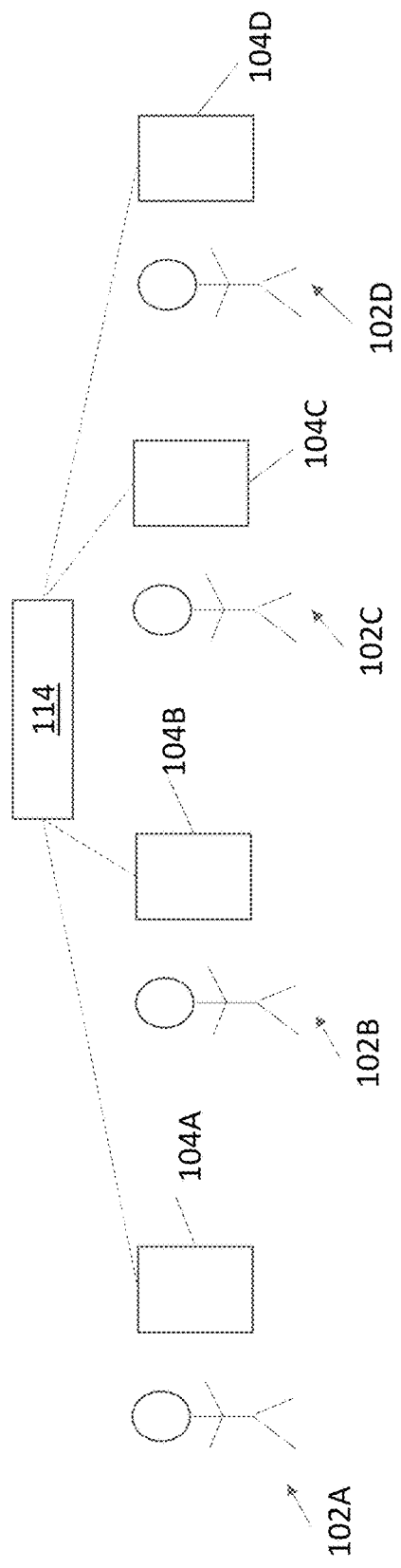
Figure 3:
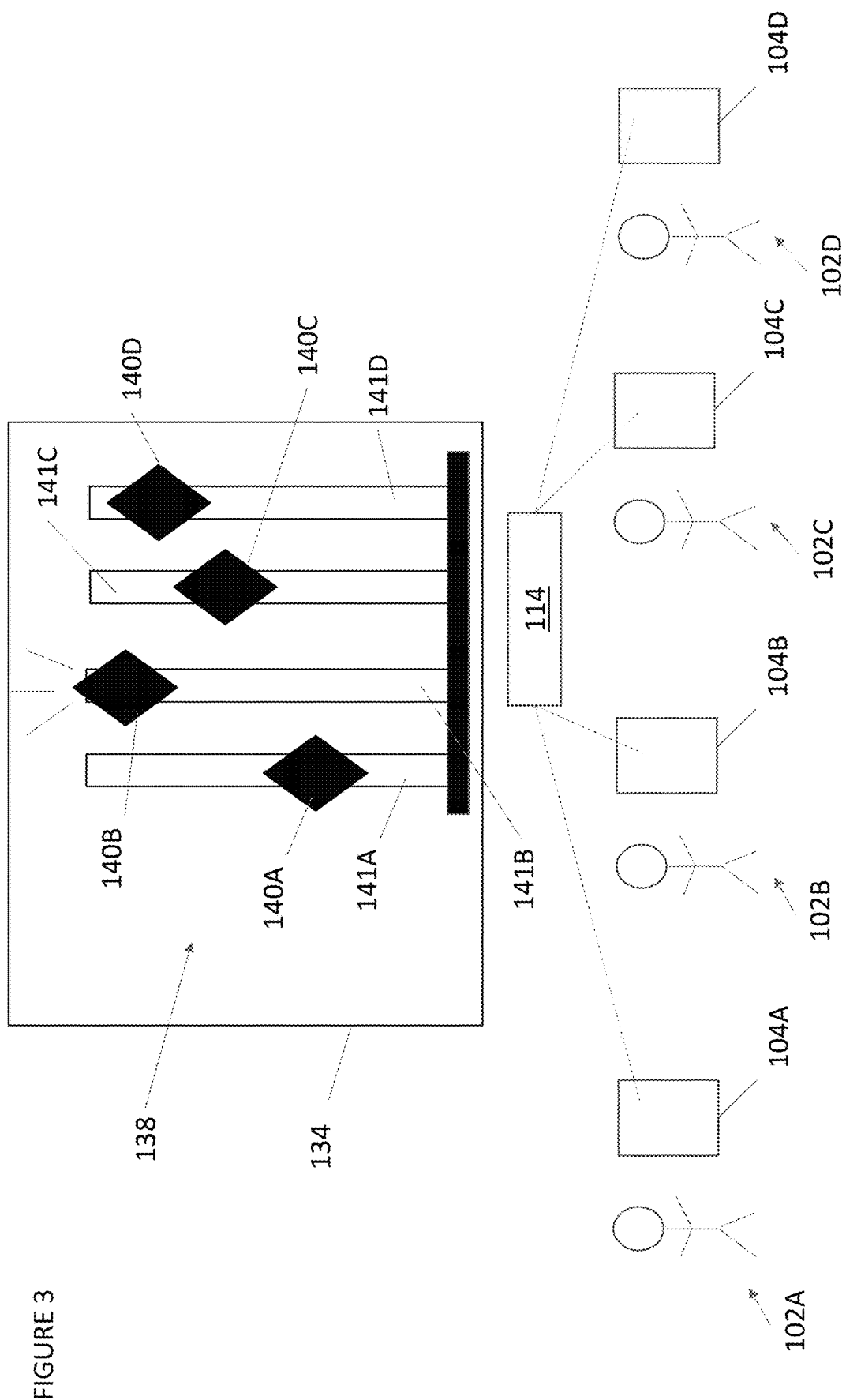
FIG. 3 a plan view of another exemplary common feedback display for use with the system of FIG. 1.

As illustrated, with particular regard to at least FIG. 2 and FIG. 3, feedback regarding student 102 performance may be provided for multiple students 102 at the common display 134. The common display 134 may be in electronic communication with the remote education subsystem 114. Such electronic communication may be wired and/or wireless across one or more networks. The common display 134 may be provided individually at each of the student subsystems 104A, 104B, 104C, 104D, or separate therefrom. For example, without limitation, the common display 134 may be provided at the displays 106 of some or all of the student subsystems 104. In other exemplary embodiments, without limitation, the common display 134 may be provided at a common location visible from each of the student subsystems 104, which may likewise be located at a common location, such as in a classroom or other space.

The common display 134 may be controlled by a competition module 120 of the remote education subsystem 114. The competition module 120 may be configured to obtain performance information from some or all of the student subsystems 104 for comparative evaluation.

The competition module 120 may be configured to generate a ranking 136 at the common display. The standings 136 may be updated in real-time. The standings 136 may indicate a relative ranking with or without identifying information for each student 102, which may be referred to by a character name, pseudonym, random name, combinations thereof, or the like. In exemplary embodiments, without limitation, the competition module 120 may refer to each student 102 by way of a repetitive character at an interactive, real-time comparison display 138.

The competition module 120 may be configured to generate and update the interactive, real-time comparison display 138. The competition module 120 may be configured to display the positive or negative result for each student 102. In exemplary embodiments, such updates may be made in substantially real-time so that the students 102 receive immediate feedback regarding their performance. Such positive and negative results may be reflected in a point system, a ranking, a movement or action, qualitative feedback, some combination thereof, or the like. In certain embodiments, the students 102 receive immediate feedback regarding an answer to a question immediately after the answer is submitted.

The interactive, real-time comparison display 138 may comprise one or more animations comparing student 102 performance by way of characters or other representations 142A-D. The characters or other representations 142 may be provided on a one-to-one basis with each of the students 102 in exemplary embodiments. The interactive, real-time comparison display 138 may be configured to provide a game-type environment or display, such as, but not limited to, a race (e.g., cars, foot race, dogs, horses, combinations thereof, or the like), adventure, challenge, sporting event, combinations thereof, or the like, by way of non-limiting example.

To give one specific example, without limitation, and referring particularly to FIG. 2, the competition module 120 may comprise, or be configured to display, a simulated race at the interactive, real-time comparison display 138. Each student 102A-102D may have a corresponding representation 140A-140D at the display 138. The representations 140 may comprise avatars or other symbols (e.g., devoid of personally identifiable information), by way of non-limiting example, which may be created by the students 102 at the student subsystems 106 in exemplary embodiments. In other exemplary embodiments, representations 140 may be randomly generated or assigned.

As positive and negative results are determined, the student's 102 relative standings 136 may be changed and their representation 140 may be likewise moved (e.g., advanced or retreated faster or slower, kept in place) on a simulated race track 141 to reflect relative performance. For example, without limitation, as a student 102 performs better, improves more, participates more, combinations thereof, or the like, on a relative basis, that student's 102 representation 140 may be likewise moved. In the illustrated example, the representations 140 may be cars, horses, individuals, arbitrary symbols, avatars, unique identifiers, combinations thereof, or the like.

In this way, students 102A-102D may be permitted to compete against one another. Of course, this is just one example which is not intended to be limiting. For example, without limitation, the simulated race may reflect each student's 102 real-time performance in assessments, such as at the assessment portal 108, though any metric may be utilized.

Any number of students 102 may be able to compete in such a manner using any number, type, or kind of representations 140.

To give another specific example, without limitation, and referring particularly to FIG. 3, the competition module 120 may comprise, or be configured to display, a number of objects 140A-D moving up and down poles 141A-D. The movement of the objects along the poles may reflect student 102 progress in performance assessments, such as at the assessment portal 108, on a real-time basis, though any metric may be utilized.

The common display 134 and/or the interactive, real-time comparison display 138 may be provided in an electronic form and/or a physical form.

In exemplary embodiments, without limitation, some or all of the student subsystems 104, instructor subsystems 124, the remote education subsystem 114, and/or component(s) thereof may comprise closed, dedicated appliances. For example, without limitation, some or all of the student subsystems 104, instructor subsystems 124, the remote education subsystem 114, and/or component(s) thereof may be configured to limit or prevent internet or other network communication other than with one another. This may help to prevent cheating otherwise unauthorized use of outside resources. As another example, without limitation, some or all of the student subsystems 104, instructor subsystems 124, the remote education subsystem 114, and/or component(s)

thereof may be configured to encrypt and/or deidentify student 102 and/or instructor 132 information.

Alternatively, or additionally, some or all of the student subsystems 104, instructor subsystems 124, the remote education subsystem 114, and/or component(s) thereof may be specially programmed. For example, without limitation, some or all of the student subsystems 104, instructor subsystems 124, and/or the remote education subsystem 114 may comprise otherwise known systems modified to so limit or prevent internet or other network communication and/or hard drive access other than to the information needed to operate the remote educational components, such as when the privacy modules 130 are connected. As another example, without limitation, some or all of the student subsystems 104, instructor subsystems 124, the remote education subsystem 114, and/or component(s) thereof may be configured to encrypt and/or deidentify student 102 and/or instructor 132 information, such as when the privacy modules 130 are connected.

In exemplary embodiments, without limitation, the student subsystems 104 may be configured to activate certain peripheral equipment, such as, but not limited to, cameras and/or microphones upon accessing the remote education subsystem 114 and/or completing assessments at the assessment portal 108, which may be recorded by the remote education subsystem 114 and/or stored at the content database 122, so as to prevent or limit cheating or otherwise unauthorized use of outside resources.

Figure 4B:
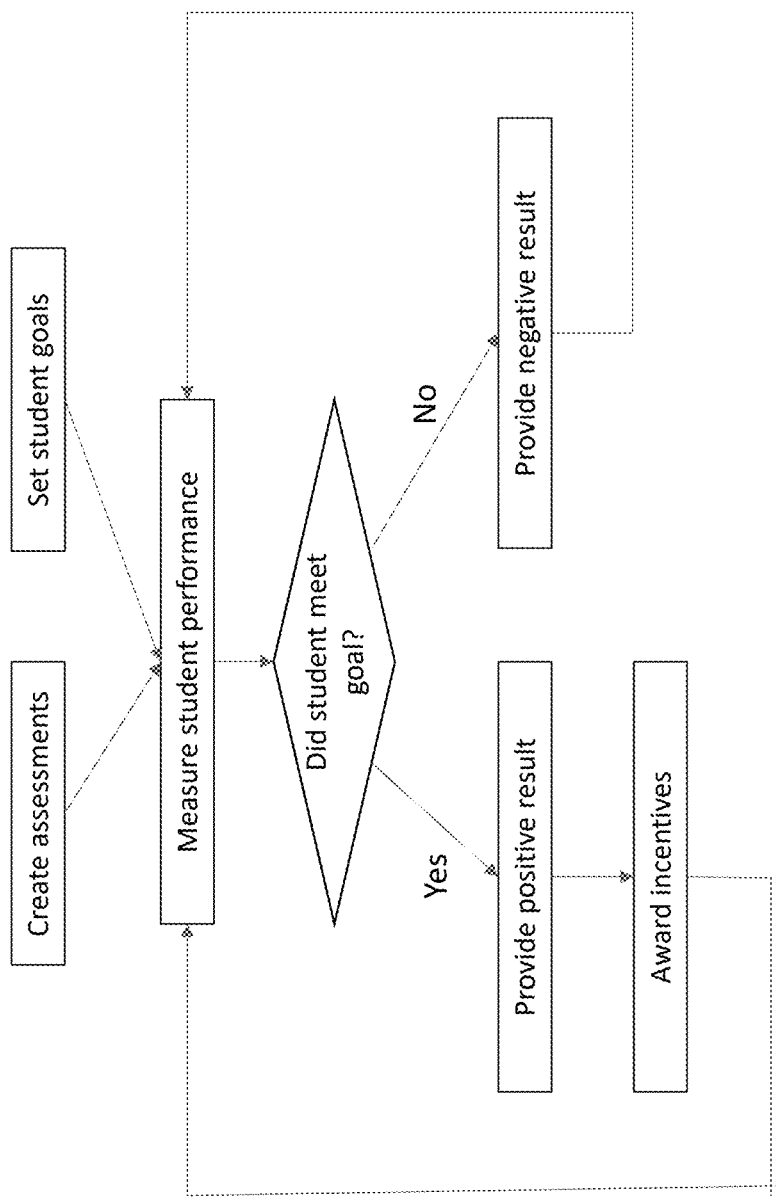
FIG. 4B is a flowchart with other exemplary logic for operating the system of FIG. 1.
Figure 5B:
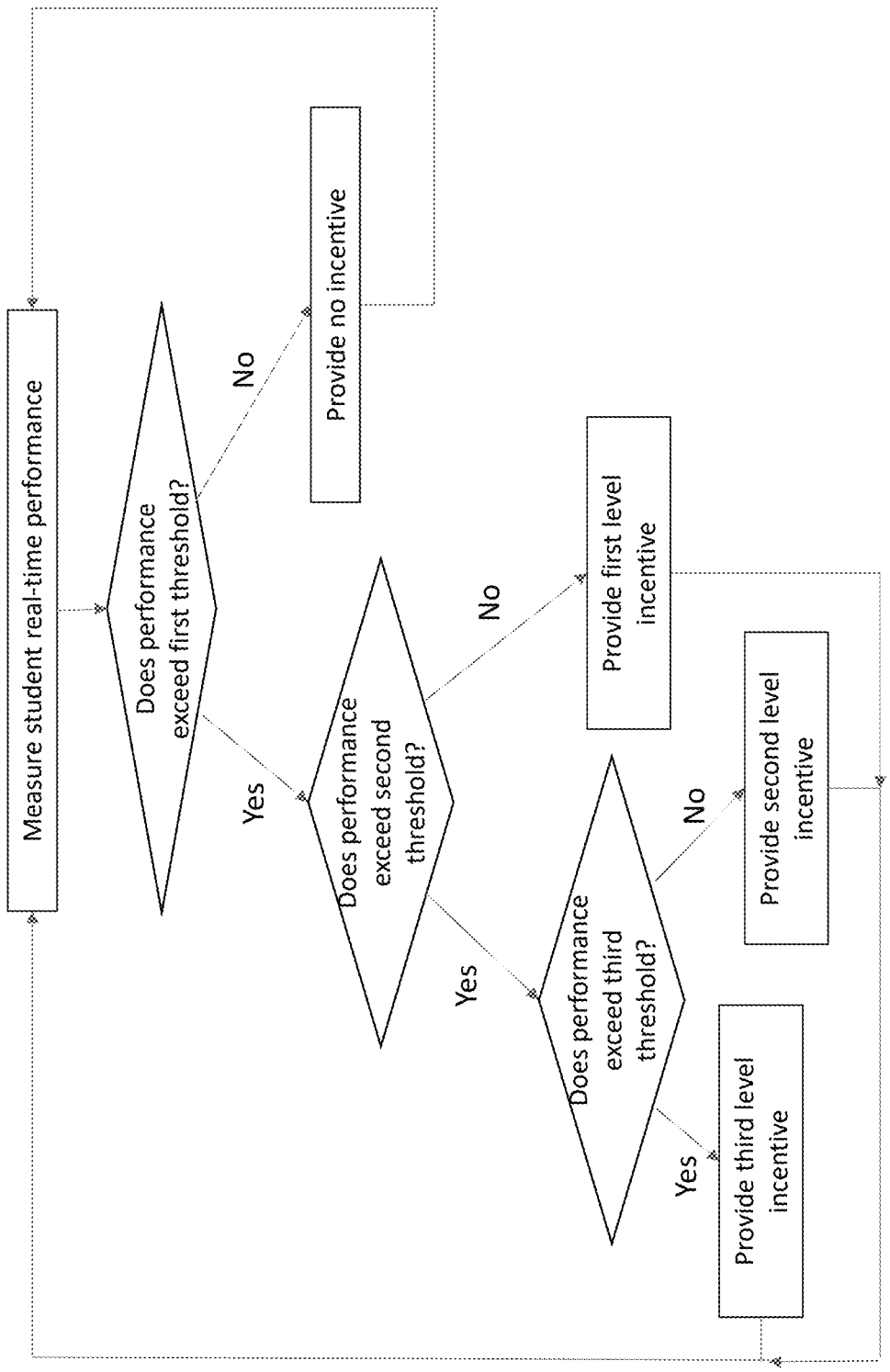
FIG. 5B is a flowchart with other exemplary logic for operating the system of FIG. 1.

As illustrated, with particular regard to FIG. 4B and FIG. 5B, the remote education subsystem 114 may comprise an incentives module 121. The incentives module 121 may be configured to provide awards to students 102 based on performance. Performance may be measured based on absolute criteria (e.g., A's or 90% or better), relative measure to other students (e.g., $1^{st}$ place), relative measures to past performance by the student 102 (e.g., improved by X points or percentages), participation (e.g., complete Y items of instruction), combinations thereof, or the like. In exemplary embodiments, performance metrics for providing incentives may be set by one or more sponsors, such as individuals or corporations. Upon reaching certain metrics, the incentives module 121 may be configured to provide various levels of incentives to achieving students 102. This may provide motivation for performance. Examples of such incentives include, but are not necessarily limited to, gift cards, coupons, cash prizes, scholarships, internship opportunities, job opportunities, educational projects, educational funding, educational credits, educational opportunities, combinations thereof, or the like.

The incentive module 121 may be configured to generate advertisements on behalf of sponsors at the student subsystems 104, such as periodically and/or upon award of or notification of incentives. The advertisements may comprise images or videos such as uploaded by the sponsors in image and/or video file format which are displayed at HTML formatted pages, banners, click-through images or videos, combinations thereof, or the like, by way of non-limiting example.

Each of the student subsystems 104 may comprise an account module 123A. The account modules 123A may be configured to track, store, and/or provide the incentives on an on-demand basis. For example, without limitation, the account module 123A may provide a listing of available incentives awarded, available incentives if the student 102 meets certain criteria, sponsorship information for sponsors of the incentives, combinations thereof, or the like. The account module 123A may be configured to electronically generate bar codes, QR codes, unique identifiers, instructions, combinations thereof, or the like, for awarded incentives upon selection.

Each of the student subsystems 104 may comprise an instructor evaluation portal 125. The instructor evaluation portal 125 may provide the students 102 with opportunities to rate instructor 132 performance. Instructor performance scoring may be received at the remote educational subsystem 122 and stored at the content database 122 in exemplary embodiments. Rankings and/or performance scores of the instructors 132 may be provided, such as at the displays 106 or the common display 134 such that instructors 132 may evaluate their relative performance and/or students 102 may select particularly ranked instructors 132. Scoring and/or ranking may be provided on an instructor 132 specific basis and/or class or session specific basis.

Alternatively, or additionally, rankings and/or performance scores of the instructors 132 may be provided based on student 102 performance, such as, but not limited to, absolute performance, relative performance, improvement levels, combinations thereof, or the like. In this manner, instructors 132 may not necessarily be evaluated solely based on popularity.

The incentives may be awarded to instructors based on student feedback and/or performance.

In exemplary embodiments, the remote educational subsystem 114 may be configured to automatically connect students 102 with highest ranked, available instructors 132 and/or classes or sessions, such as for particular subject matters and/or topics.

Incentives may be awarded by the incentives module 121 to instructors 132 based on instructor 132 performance. Such incentives may be stored at account modules 123B associated with the instructor systems 124.

Such instructor feedback may be encrypted and/or deidentified by the privacy modules 130.

In exemplary embodiments, without limitation, the remote education subsystem 114 may be configured to facilitate identification of suitable instructors 132 for students 102, connection of students 102 with instructors 132, the hiring of instructors 132, the payment of instructors 132, storage and/or identification of certifications for instructors 132, student 102 availability signaling, instructor 132 availability signaling, combinations thereof, or the like, by way of one or more components, systems, and/or methods shown and/or described in at least US Pub. No. 2021/0383309 published Dec. 9, 2021, the disclosures of which are hereby incorporated by reference as if fully restated herein.

Figure 6B:
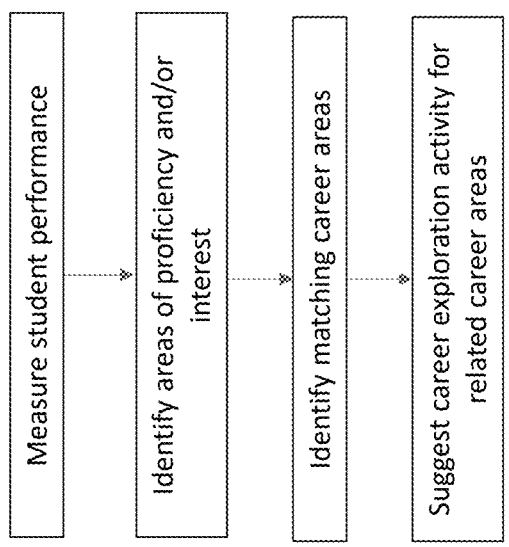
FIG. 6B is a flowchart with other exemplary logic for operating the system of FIG. 1.
Figure 6A:
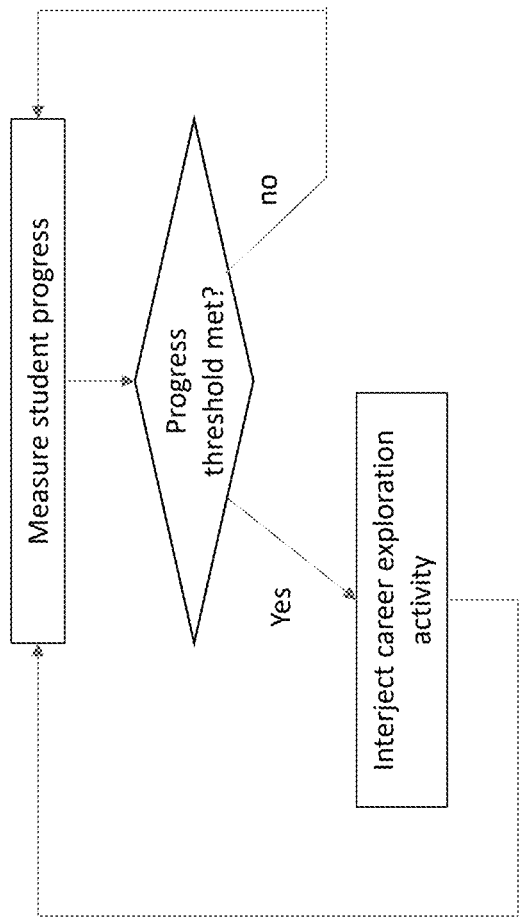
FIG. 6A is a flowchart with other exemplary logic for operating the system of FIG. 1.
Figure 7:
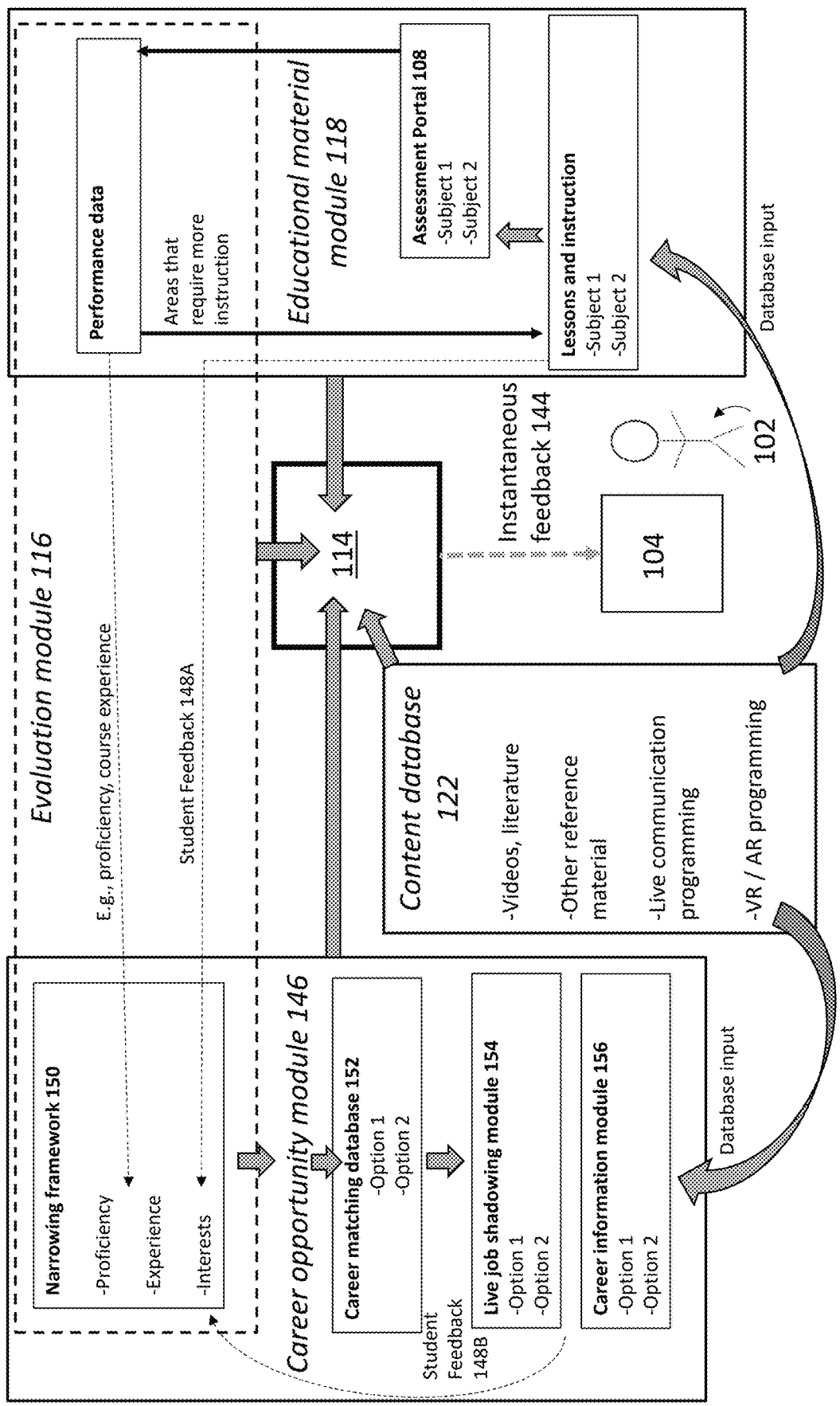
FIG. 7 is a flowchart with other exemplary logic for operating the system of FIG. 1.

Referring to FIG. 6A and FIG. 6B, in exemplary embodiments, the remote educational subsystem 114 may be configured to associate subjects with career options and related materials. By way of non-limiting example, the content database 122 and/or other electronic storage device may comprise a table correlating subject areas of study or instruction with career options and/or materials. For example, without limitation, math and physics courses may be linked with engineering, biology studies or activities with biologist, biology and chemistry subject areas with physician, pharmacist, and/or other medical professionals, and so forth. Referring to FIGS. 6A, 6B and 7, the students 102 may be able to query, by way of the student subsystems 104, careers and materials related to previously selected areas of study or instruction, scheduled areas of study or instruction, areas of study or instruction where the student 102 received relatively positive feedback, areas of study or instruction where the student 102 indicated interest, combinations thereof, or the like. Alternatively, or additionally, the remote educational subsystem 114, which preferably provides instantaneous feedback 144 to the student subsystems 104, may be configured to prompt the students 102 with such career options and/or materials periodically, randomly, or the like.

Referring to FIG. 7, the remote educational subsystem 114 may include each of an educational material module 118, an evaluation module 116, a career opportunity module 146, and a content database 122. The educational material module 118 may include lessons and instruction for different learning subjects, and an assessment portal 108 for communicating performance data with respect to different learning subjects to the evaluation module 116. The content database 122 may communicate videos, literature, other reference material, live communication programming, programming for VR/AR based instruction, some combination thereof, or the like, to the educational material module 118. Lessons and instruction provided by the educational material module 118 may be determined, at least in part, based on areas the student 102 requires more instruction, such as by way of example and not limitation, based on the student's overarching academic goals, learning goals, learning principles, career goals and interests, learning interests, some combination thereof, or the like.

The educational module 116 may be configured to direct the student 102 to provide feedback 148A regarding, by way of example and not limitation, career interests and learning interests to a narrowing framework 150 of a career opportunity module 146 to contribute to identifying careers and/or groups of careers that may be suitable for the student 102. Information about identified careers and/or groups of careers that may be suitable for the student 102 may be communicated to the educational material module 118 to further contribute to determining learning subjects for the student 102 that may require more instruction.

Referring again to FIGS. 6A, 6B and 7, multiple criteria may be used to match students 102 with careers, such as at the table of the content database 122. For example, without limitation, an engineering career may be linked to math, physics, and various shop skills, interests, and/or courses. When student 102 interest or achievement reaches a certain threshold in at least a predetermined number of such categories, the remote educational subsystem 114 may be configured to prompt the students 102 with such career options and/or materials. For example, without limitation, when the student 102 reaches a threshold score in at least three of five categories, the remote educational subsystem 114 may be configured to so prompt the students 102 to the career options according to a narrowing framework 150 and a career matching database 152 of the career opportunity module 146. The career matching database 152 may include a listing of any number of different careers and categories thereof, and each career may include criteria pertaining to learning subject proficiency, course experience, career interests (e.g., 148A), learning interests, some combination thereof, or the like, required for the student 102 to satisfy in order to match with the career.

It is not intended that learning subject proficiency data and course experience data incorporated in the narrowing framework 150 necessarily be limited to performance data from assessment of exercises in a single educational material module 118. By way of example, and not limitation, learning subject proficiency data and course experience data may also include performance data from the student's 102 academic performance in a traditional classroom. The aforementioned data may be entered directly into an evaluation module 116, such as to supplement performance data from the educational material module 118, or as an alternative thereof.

The career options may be linked, such as at the content database 122, with career materials, which may include, for example without limitation, videos, reading, reference materials, VR and/or AR simulation experiences, combinations thereof, or the like, related to the various career options. The materials may include, alternatively, or additionally, linked or automatically scheduled videoconferences with persons with experience in the particular career field. The aforementioned materials may be accessed according to a career information module 156 in communication with the content database 122. The videos may include 10-minute to 2-hour videos covering aspects of a particular career, including typical work activity the particular career involves.

Students 102 may be prompted, such as by way of the remote educational subsystem 114 and/or student subsystems 106, with options to explore various careers and related materials linked to their interests, areas of study, and/or areas of proficiency. This may occur at the end of a semester, after a certain number of courses are completed, after a certain number of surveys (e.g., 148A, 148B) are completed, some combination thereof, or the like. Alternatively, or additionally, requirements for exploring career options and/or materials may be provided, such as part of a larger curriculum, periodically (e.g., every 40 hours), combinations thereof, or the like. The career opportunity module 146 may further include a live job shadowing module 154. An exemplary live job shadowing module 154 may provide for virtual shadowing of certain jobs, said virtual shadowing including, by way of example and not limitation, virtual workplace tours, interviews or Q & A with those practicing the particular job, observation of work activity of those practicing the particular job, virtual workshops related to familiarizing the student 102 with work activity of the particular job, some combination thereof, or the like. The live job shadowing module 154 and/or the career information module 156 may further provide commercials for different entities offering opportunities pertaining to relevant careers. The live job shadowing module 154 may require adult students to sign a consent form to participate in virtual shadowing, and minors may be required to have a parent sign a consent form and be present during virtual shadowing for the student to participate in the virtual shadowing. Such consent forms, signatures, and record documentation may be realized electronically, such as in a fully or partially automated fashion. Alternatively, or additionally, facial recognition software may be utilized to recognize a second person above an approximate age of consent (e.g., 18, 21) in captured videos or images for real-time videoconferences. Alternatively, or additionally, videographically or audio recorded consent may be obtained and facial recognition and/or voice recognition technology may be used to authenticate the face and/or voice of a parent or guardian, such as against relevant data stored on file.

In exemplary embodiments, without limitation, feedback surveys 148A-B may be provided to students 102, such as electronically at the student subsystem 104, for expressing interest in various subjects or related careers, such as after completing various courses. Student feedback 148B may also be provided after the student 102 engages with the career information module 156 and live job shadowing module 154 to better inform the student's 102 career interests. For example, not by way of limitation, the student 102 may communicate to the narrowing framework 150 that he or she is no longer interested in a particular career after exploring virtual shadowing with respect to that career. The survey results may be used to evaluate the student's 102 interest in various subjects and/or careers. The survey data may be combined with the performance and/or completion data for various subjects to identify matching career opportunities, such as by application of one or more weighted average approaches. For example, without limitation, weights may be applied to each response of a numerical survey score (e.g., Likert scale) for each subject and/or career, a numerical score for student 102 performance and/or evaluation (e.g., cumulative or subject based, out of 100), and/or completion of various subjects, materials, and/or courses (e.g., cumulative or subject based, out of 100%). A score may be calculated for each subject or related career and the results ranked and provided to the student 102. An exemplary weighted average algorithm approach is provided, at least in part, below by Equation 1.

$$Score_N = (A \times S_1) + (B \times S_2) + (C \times S_3) \qquad \text{Equation 1}$$

Where the $Score_N$ may be determined on a subject and/or career specific basis, A, B, and C may represent weighting, which may be varied, and $S_1$, $S_2$, and $S_3$ may represent interest, performance, and completion scores, respectively. The interest score may be determined based on survey feedback. Performance and/or completion scores may be provided by the evaluation module 116, in exemplary embodiments.

Students 102 may be evaluated based on proficiency which may permit ability to advance through learning irrespective of age or other artificial classification. When sufficient mastery or achievement is demonstrated, such as at the evaluation module 116, students 102 may be permitted to progress through additional course materials and/or become eligible for certain virtual career experiences or opportunities, various certifications or qualifications, combinations thereof, or the like, such as by way of the remote educational subsystem 114 and/or content database 122.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like, configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for providing secure, anonymized, and comparative real-time educational feedback, said system comprising:

an instructor subsystem comprising a display and one or more user input devices;

student subsystems, each comprising a display and one or more user input devices;

a common display, separate from the student subsystems and the instructor subsystem;

a remote education subsystem electronically interposed between the instructor subsystem, the student subsystems, and the common display;

a content database electronically connected to the remote education subsystem, wherein the content database comprises electronically stored educational material;

a network comprising the instructor subsystem, the student subsystems, the common display, and the remote education subsystem;

a series of privacy modules, a first one of which is located at the remote education subsystem, and additional ones of which are located at the instructor subsystem and the student subsystems, wherein the privacy modules are closed appliances with pre-programmed hardware configured to communicate exclusively with other of the privacy modules on the network, thereby providing interoperability between the same, wherein the first one of the privacy modules comprises a table linking personally identifying information with anonymous identifiers in a dedicated and electronically isolated memory thereof, and wherein the privacy modules comprise security keys for encrypting and decrypting network communications; and one or more non-transitory electronic storage devices forming part of the network and comprising software instructions, which when executed, configure one or more processors forming part of the network to:

facilitate videoconferencing between each of the student subsystems and the instructor subsystem by execution of videoconferencing software and data streaming between the same;

retrieve certain of the educational material from the content database by electronic query to the content database;

cause the retrieved educational material to be electronically displayed at the displays of the student subsystems by way of transmission of electronic signal including the retrieved educational material;

provide an academic assessment and a career compatibility assessment at the student subsystems, including at the displays thereof, wherein said academic assessment and said career compatibility assessment are electronically completable at and by way of the student subsystems;

based on electronically submitted student input from the one or more user input devices of the student subsystems, including in response to the academic assessment and the career compatibility assessment, generate feedback in accordance with the student input and cause representations of the generated feedback to be electronically displayed at the display of the student subsystems;

deidentify, by way of the first one of the privacy modules, the student input received by the student subsystems, including by removing the personally identifying information of or associated with the student input and assigning the anonymous identifiers to the student input received from users of the student subsystems in accordance with the table on a user-by-user basis, and encrypt, by way of the privacy modules, the student input received from the users of the student subsystems in accordance with the security keys, prior to subsequent transmission on the network between the privacy modules such that further network communication is encrypted and deidentified and is capable of decryption by way of the security keys; and generate graphical output at the common display comprising a real-time comparison ranking display with gaming elements indicating relative student performance based on the feedback provided from the academic assessment for the student subsystems in a relative fashion and with at least one gaming representation at the common display in association with the anonymous identifier for each of the respective users, said at least some gaming representation comprising an avatar or symbol;

wherein the privacy modules comprise, or are electronically connectable to, at least one or more of the one or more non-transitory electronic storage devices and the one or more processors.

2. The system of claim 1, wherein:
at least some of the student subsystems comprises a virtual reality device, where the display of the at least some of the student subsystems is provided as part of said virtual reality device.

3. The system of claim 2, wherein:
the one or more non-transitory electronic storage devices comprise additional software instructions, which when executed, configure the one or more processors to:
analyze at least a portion of the student input, wherein at least the portion of the student input comprises indications of interest level in various fields, to determine one or more potential careers and cause the student subsystems to each display respective information about the respective one or more potential careers.

4. The system of claim 3, wherein:
the one or more non-transitory electronic storage devices comprise additional software instructions, which when executed, configure the one or more processors to:
cause the student subsystems to display the respective information about the respective one or more potential careers when a threshold score in at least three of five categories of the academic assessments relevant to a respective one of the potential careers is achieved.

5. The system of claim 4, wherein:
the certain of the educational material from the content database comprises content for career opportunities;
the instructor subsystem is associated with a hiring individual for an entity associated with the content for career opportunities; and
the videoconferencing and the feedback is provided at the virtual reality device.

6. The system of claim 5, wherein:
the instructor subsystem comprises a second virtual reality device.

7. The system of claim 6 further comprising:
a live job shadowing module which facilitates the videoconferencing and the feedback, wherein the live job shadowing module is configured to:
record images or videos during said videoconferencing;
utilize facial recognition software to recognize a second person in said recorded images or videos;
identify if the second person is above a predetermined age of consent based on said recorded images or videos.

8. The system of claim 7 wherein:
the live job shadowing module is configured to:
where the second person is identified to be above the predetermined age of consent based on said recorded images or videos, store captured data regarding facial characteristics and audio characteristics of the second person; and
utilize facial recognition and voice recognition technology to authenticate further of the record images or videos during said videoconferencing of the second person providing consent information for certain activities against said captured data.

9. The system of claim 1, wherein:
the one or more non-transitory electronic storage devices comprise additional software instructions, which when executed, configure the one or more processors to:
receive and evaluate the student input in real-time to permit feedback related to the student input to be represented at the student subsystems display in real-time.

10. The system of claim 1, wherein:
the instructor subsystem is adapted to permit an instructor to at least one selected from the group of:
contribute to an academic assessment;
contribute to a career compatibility assessment; and
view student input and contribute to feedback related to the student input, the feedback represented at the displays of the student subsystems.

11. The system of claim 1, wherein:
the one or more non-transitory electronic storage devices comprise additional software instructions, which when executed, configure the one or more processors to:
electronically transmit indications of awards at each of the student systems when achievement of a threshold performance on an academic assessment is registered.

12. The system of claim 11, wherein:
the content database is configured to provide advertisements at the displays of the student subsystems; and
the advertisement is provided by a sponsor also providing the award.

13. The system of claim 1 wherein:
the remote education subsystem is a closed, dedicated appliance;
each of the student subsystems and the instructor subsystem comprise a closed, dedicated appliance; and
the network comprises a closed network.

14. The system of claim 1 wherein:
said one or more non-transitory electronic storage devices comprise additional software instructions, which when executed, configure said one or more processors to:
activate peripheral equipment, including microphones and video cameras, upon connection of, and at least while completing the academic assessment at, the student subsystems to the remote educational subsystem.

15. The system of claim 1 wherein:
the academic assessment comprises any one or more of: multiple choice questions, fill in the blank questions, and narrative prompts; and
the submitted student input comprises one or more of: user selections, drawings, audio, video, images, and typed characters.

16. The system of claim 1 wherein:
the academic assessment comprises all of: multiple choice questions, fill in the blank questions, and narrative prompts; and
the submitted student input comprises all of: user selections, drawings, audio, video, images, and typed characters.

17. The system of claim 1 wherein:

each of the privacy modules comprise an adapter to provide the connection to the at least one or more of the one or more non-transitory electronic storage devices and the one or more processors, said adapter selected from the group consisting of: universal serial bus, lightning, Ethernet, and near field communication device.

* * * * *